(12) United States Patent
Corcoran

(10) Patent No.: US 8,793,012 B2
(45) Date of Patent: Jul. 29, 2014

(54) CONTAINER SCANNING SYSTEM AND METHOD

(71) Applicant: John F Corcoran, Hyannis, MA (US)

(72) Inventor: John F Corcoran, Hyannis, MA (US)

(*) Notice: Subject to any disclaimer, the term of this patent is extended or adjusted under 35 U.S.C. 154(b) by 119 days.

(21) Appl. No.: 13/708,895

(22) Filed: Dec. 7, 2012

(65) Prior Publication Data

US 2014/0158908 A1 Jun. 12, 2014

(51) Int. Cl.
*G06F 7/00* (2006.01)
*G21K 5/10* (2006.01)

(52) U.S. Cl.
CPC .......................................... *G21K 5/10* (2013.01)
USPC ........... 700/215; 700/213; 700/214; 700/218; 700/222; 414/281

(58) Field of Classification Search
CPC .................................. G05B 15/02; G05B 19/02
See application file for complete search history.

(56) References Cited

U.S. PATENT DOCUMENTS

| | | | |
|---|---|---|---|
| 3,746,188 A | 7/1973 | Stienen et al. | |
| 4,307,922 A | 12/1981 | Rhodes | |
| 4,789,210 A | 12/1988 | Weiss et al. | |
| 5,062,242 A * | 11/1991 | Corcoran | 52/36.1 |
| 5,140,787 A * | 8/1992 | Corcoran | 52/36.1 |
| 5,860,783 A | 1/1999 | Corcoran | |
| 6,077,019 A | 6/2000 | Corcoran | |
| 6,738,687 B2 * | 5/2004 | Hanel | 700/214 |
| 8,494,673 B2 * | 7/2013 | Miranda et al. | 700/216 |
| 2004/0165974 A1 | 8/2004 | Gironi et al. | |

FOREIGN PATENT DOCUMENTS

| | | |
|---|---|---|
| GB | 327836 A | 4/1930 |
| GB | 576627 A | 4/1946 |
| GB | 1327943 A | 8/1973 |
| RU | 1792892 A1 | 2/1993 |
| RU | 51602 U1 | 2/2006 |
| WO | PCT/US2012/055669 | 3/2013 |

OTHER PUBLICATIONS

Corcoran, "The Magic Bullet", Trends & Developments, Feb. 21, 2005, pp. 1-3, vol. 2, Art. 19, from "www.automatedsystemsltd.com/developments", US.
Corcoran, "A Pleasant Surprise!", Trends & Developments, Aug. 5, 2005, p. 1, vol. 2, Art. 19, from "wwvv.automatedsystemsltd.com/developments", US.

* cited by examiner

*Primary Examiner* — Yolanda Cumbess
(74) *Attorney, Agent, or Firm* — Douglas Denninger

(57) ABSTRACT

A system and method of scanning a number of objects such as crates or intermodal containers in a storage area having a plurality of movable racks, each rack occupying at least one level and capable of carrying at least one object. The racks are capable of being moved to establish successive vacant multi-level aisles among the racks. At least one scanner is movable substantially vertically within the successive vacant aisles to scan successive objects substantially adjacent to each vacant aisle to detect at least one pre-determined characteristic.

19 Claims, 9 Drawing Sheets

CONTAINER SCANNING SYSTEM AND METHOD

FIELD OF THE INVENTION

The invention relates to security scans of intermodal containers.

BACKGROUND OF THE INVENTION

Items to be transported are often placed in intermodal containers, also referred to as cargo containers, which are included within the term "container" as used herein. Each intermodal container is a standardized packing case, typically having a length of 20 or 40 feet, although other standardized lengths are known. The 20-foot container is often used as a unit of measure, and containers are rated according to TEU, Twenty-foot Equivalent Units, for storage and transportation calculations. Container ships large enough to carry 6,000 TEU or more are known.

There is a risk of unauthorized, potentially dangerous material being hidden in a container. While scanning equipment exists, it is challenging to adequately scan a large number of containers, especially at transfer facilities where space is at a premium and other vessels, vehicles or other transportation equipment are waiting for loading and unloading.

It is therefore desirable to have an improved system and procedure for scanning many containers while minimizing impact on commerce.

SUMMARY OF THE INVENTION

An object of the present invention is to enable thorough security scanning of multiple containers.

Another object of the present invention is to utilize storage and/or transit periods for security scanning.

This invention features a system of scanning a number of objects such as intermodal containers in a storage area having a plurality of movable racks, each rack occupying at least one level and capable of carrying at least one object. The racks are capable of being moved to establish successive vacant multi-level aisles among the racks. At least one scanner is movable substantially vertically within the successive vacant aisles to scan successive objects substantially adjacent to each vacant aisle to detect at least one pre-determined characteristic.

In some embodiments, each rack includes a chassis movable along at least one track. Each rack is movable in at least one side direction. In certain embodiments, the scanner is suspended from a crane capable of lifting at least one intermodal container. In one embodiment, the system generates an alert when the scanner detects at least one pre-determined characteristic.

This invention may also be expressed as a method of scanning a number of objects in a multi-level environment, including selecting a storage area having a plurality of movable racks, each rack occupying at least one level and capable of carrying at least one object. A scanner is selected, and a first vacant multi-level aisle is established among the racks. The method further includes moving the scanner substantially vertically within the first vacant aisle to scan successive objects substantially adjacent to the first vacant aisle to detect at least one pre-determined characteristic. At least a second vacant multi-level aisle is then established among the racks, and the scanner is moved substantially vertically within at least the second vacant aisle to scan additional objects substantially adjacent to the second vacant aisle.

In some embodiments, each rack is configured to hold at least one intermodal container. In certain embodiments, the scanner is suspended from a crane capable of lifting at least one intermodal container. In one embodiment, the method further includes generating an alert when the scanner detects the at least one pre-determined characteristic.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

This invention may be accomplished by a system and method of scanning a number of objects such as crates or intermodal containers in a storage area having a plurality of movable racks, each rack occupying at least one level and capable of carrying at least one object. The racks are capable of being moved to establish successive vacant multi-level aisles among the racks. At least one scanner is movable substantially vertically within the successive vacant aisles to scan successive objects substantially adjacent to each vacant aisle to detect at least one pre-determined characteristic such as radiation from an unauthorized radioactive item within the object.

Figure 1:
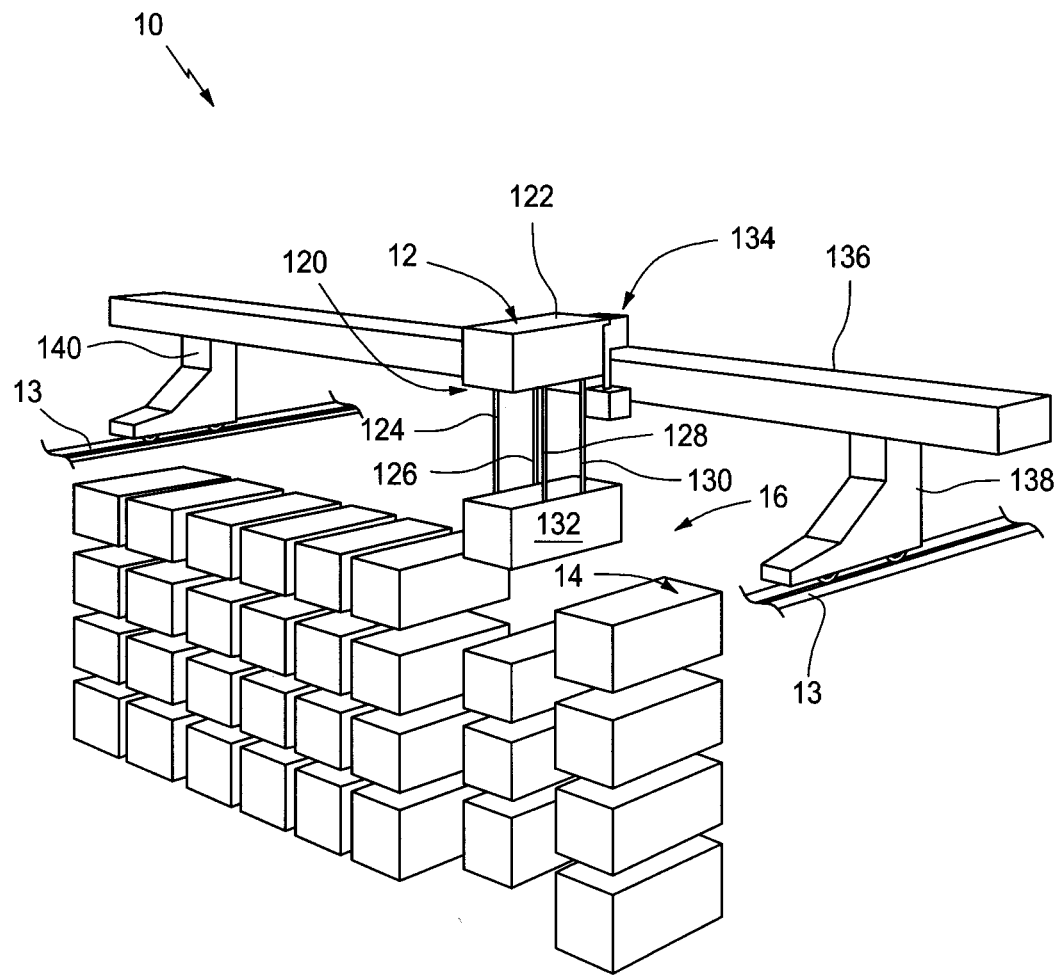
FIG. 1 is a schematic perspective view of a prior art cargo container storage and retrieval system by the present inventor.
Figure 2:
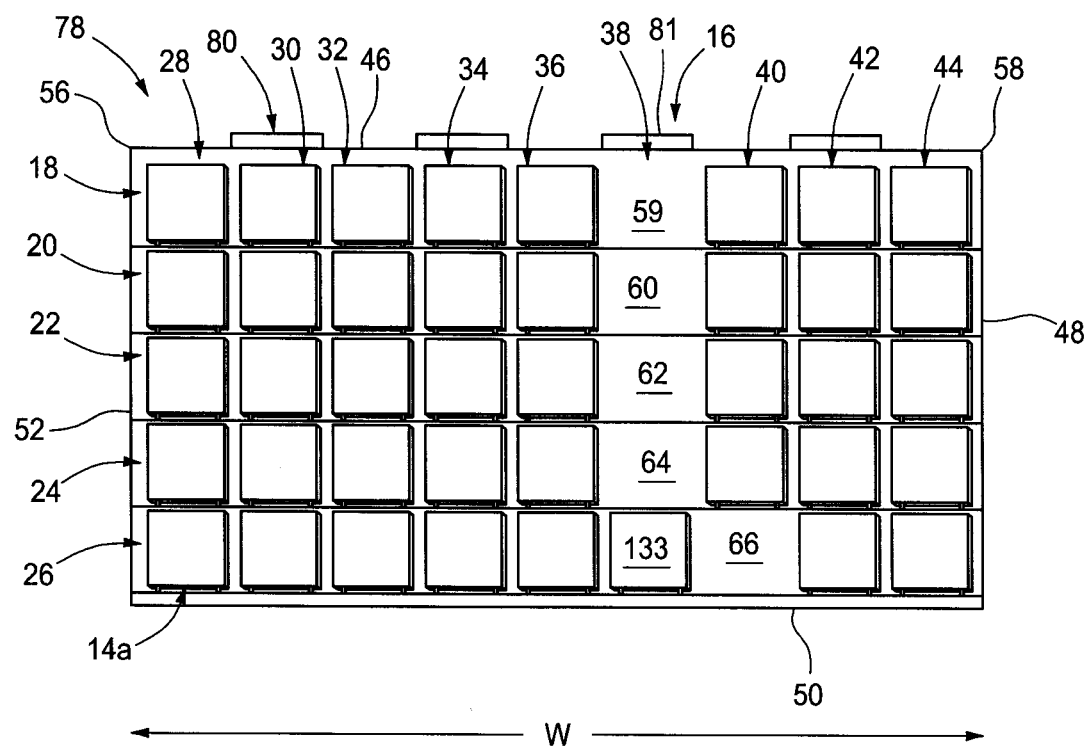
FIG. 2 is a schematic cross-sectional view of a cargo hold of a cargo vessel equipped with the prior art cargo container and storage retrieval system.

The system and method according to the present invention are particularly useful with prior art cargo container storage and retrieval systems such as disclosed by the present inventor in U.S. Pat. Nos. 5,860,783 and 6,077,019, which are incorporated herein by reference in their entireties, and as represented by FIGS. 1 and 2 herein. In the illustrated embodiment, prior art storage and retrieval system 10, FIG. 1, includes a mobile gantry crane 12 that slides fore (forward) and aft (backwards) on crane tracks 13 to lower and raise containers 14. Gantry crane 12 includes a hoist 120 installed within housing 122 and having cables 124, 126, 128 and 130 shown removably attached to an intermodal container 132 with known implements. Hoist housing 122 is carried by a trolley 134 that travels along a beam 136 which is supported on legs 138 and 140.

One prior art stacking plan for containers is illustrated schematically in FIG. 2 within a cargo hold 16, defined by borders 46, 48, 50 and 52, of an ocean transport vessel or other transportation equipment. A plurality of containers 14a are arranged in a number of levels vertically spaced one above another within vessel hold 16. Each level may also be referred to as a tier. A plurality of racks are arranged along each level. In this construction, each rack has a single chassis seat in one of tiers 18, 20, 22, 24 and 26. Each chassis seat can be positioned in one of columns 28, 30, 32, 34, 36, 38, 40, 42 and 44 within each tier. One chassis seat position 59, 60, 62, 64 and 66 remains vacant in each tier so that, after appropriate movement of containers as described in U.S. Pat. Nos. 5,860,783 and 6,077,019, a selected container within any tier can be retrieved as desired. As shown in FIG. 2, the vacant positions 59, 60, 62 and 64 have been established above container 133 so that it can be raised through hatch 81, which is one of a number of access hatches 80 defined in main deck 78.

Figure 3:
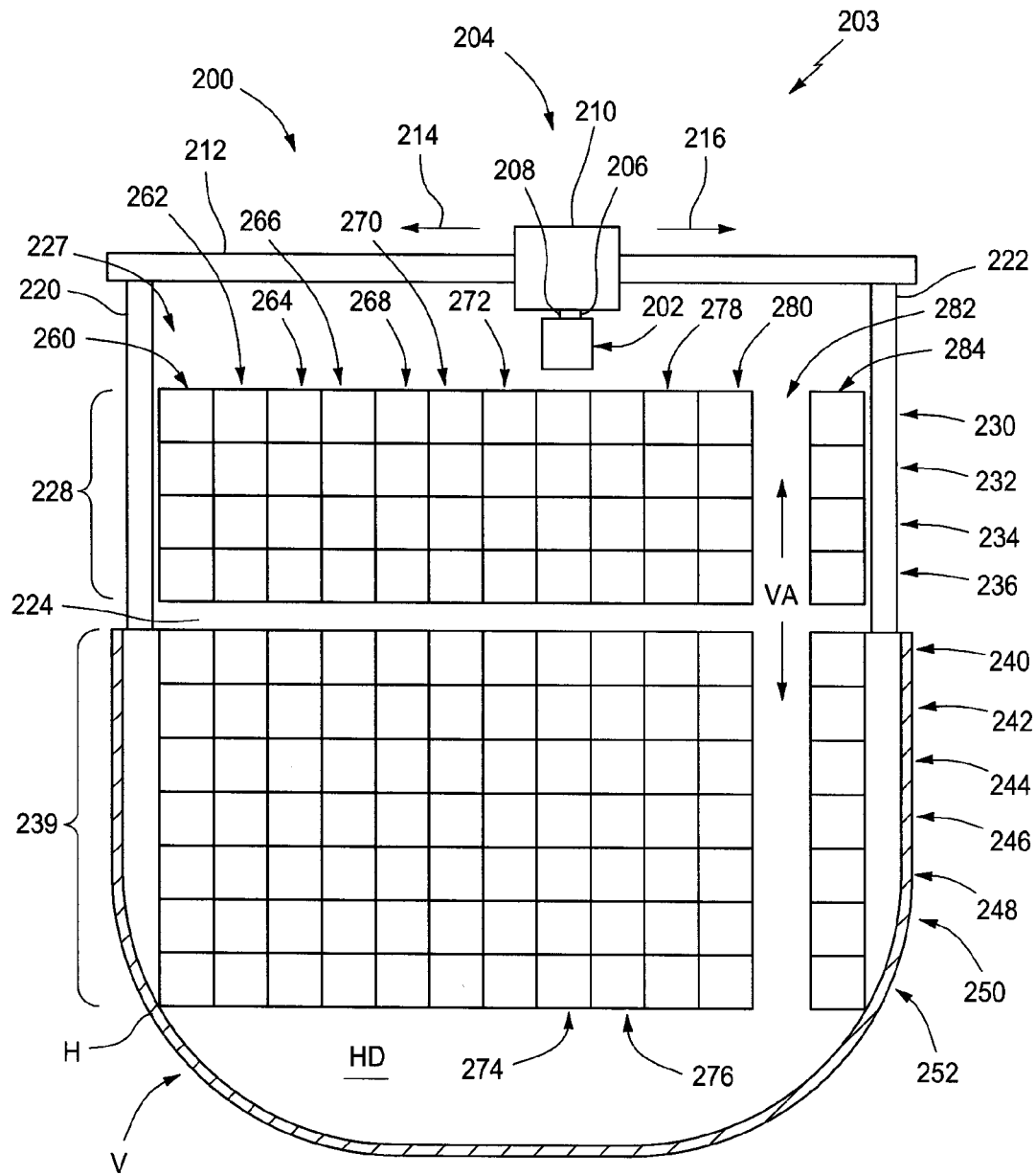
FIG. 3 is schematic cross-sectional view of a loaded cargo vessel equipped with a container scanning system according to the present invention with a scanner in a raised condition.

Scanning system 200 according to the present invention is illustrated in FIG. 3 as part of a schematic partial cross-sectional view looking aft through a hull H of a loaded cargo vessel V. In this view, a scanner 202 is shown in a raised condition suspended from a shipboard gantry crane 203 having a hoist 204 with cables 206 and 208. Hoist 204 is installed within a housing 210 that is carried by a trolley (not visible) that travels along a beam 212 in the side directions indicated by arrows 214 and 216. Gantry crane 203 includes legs 220 and 222 which are fixedly secured to main deck 224 in some constructions and, in other constructions, are movable fore and aft along rails or other features (not shown).

In this construction, some of containers 227 are positioned in racks on levels 230, 232, 234 and 236 as an upper, above-deck group 228 and the remaining containers 227 are positioned on racks in levels 240, 242, 244, 246, 248, 250 and 252 as a lower, below-deck group 239 within hold HD of vessel V. The containers 227 are also positioned in columns 260, 262, 264, 266, 268, 270, 272, 274, 276, 278, 280, 282 and 284. Column position 282 has been cleared within each level to establish a vacant aisle VA in FIGS. 3 and 6, as described in more detail below.

In general, the present invention includes a method of scanning a number of objects in a multi-level environment, including selecting a storage area having a plurality of movable racks, each rack occupying at least one level and capable of carrying at least one object. A scanner is selected, and a first vacant multi-level aisle is established among the racks. The method further includes moving the scanner substantially vertically within the first vacant aisle to scan successive objects substantially adjacent to the first vacant aisle to detect at least one pre-determined characteristic such as radiation from an unauthorized radioactive item within the object. At least a second vacant multi-level aisle is then established among the racks, and the scanner is moved substantially vertically within at least the second vacant aisle to scan additional objects substantially adjacent to the second vacant aisle.

One benefit of the present invention is that the scanning of objects can be accomplished during normally inactive periods for the objects such as during ocean transport of intermodal containers between ports. Preferably, all containers or other selected objects are sufficiently scanned to locate unauthorized radioactive materials, explosives, drugs or other contraband prior to off-loading of the objects.

Figure 4:
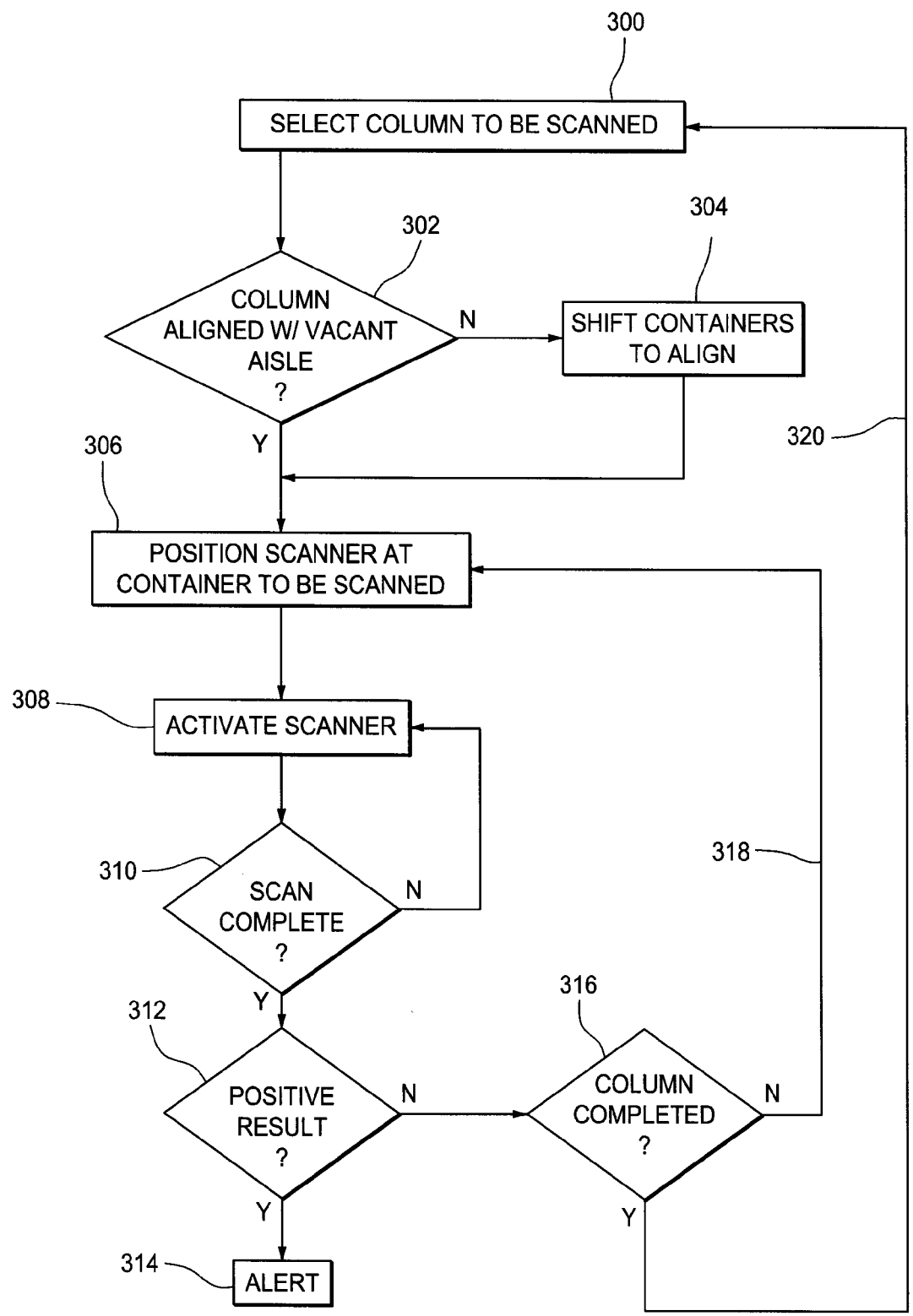
FIG. 4 is a flow chart depicting sequential scanning according to the present invention of objects such as intermodal containers.

FIG. 4 is a flow chart depicting sequential scanning according to the present invention of objects such as intermodal containers, beginning with step 300 during which a column to be scanned is selected. The method proceeds to decision step 302 in which the selected column to be scanned is analyzed to confirm that a vacant aisle has been established substantially adjacent to the selected column. If not, the logic proceeds to step 304 in which containers are shifted to establish the vacant aisle next to the selected column and, after step 302 is satisfied, a scanner is positioned, step 306, within the vacant aisle substantially adjacent to a container to be scanned. The scanner is activated, step 308, until the scan is complete as assessed in step 310. If a positive result is detected, step 312, an alert can be generated, step 314.

Types of scanners suitable for the present invention include Geiger counters and other detectors of radioactivity, chemical detectors for explosives or illicit drugs, x-ray scanners, and other detectors that will occur to those of ordinary skill in the art after reviewing this disclosure. Types of scanners include both active emitters and passive detectors and sensors. A video camera or other observation equipment is included in some constructions.

Possible actions to be taken after an alert is generated include sounding an alarm to inform an operator, marking the suspicious container with high-visibility spray paint or other identifying substance for later quarantine and/or more detailed inspection. For containers found to carry highly dangerous materials, those targeted containers can be individually removed from the storage area and handled appropriately, including safe deactivation, containment and/or disposal.

If a positive result is not detected for that container, scanning continues along the vacant aisle until the entire selected column has been completed as assessed in step 316. Arrow 318 represents a return to positioning the scanner, step 306, at the next container to be scanned within the selected column. After every container has been scanned adjacent to the vacant aisle, the logic returns to step 300 in which another column is selected to be scanned.

Figure 5:
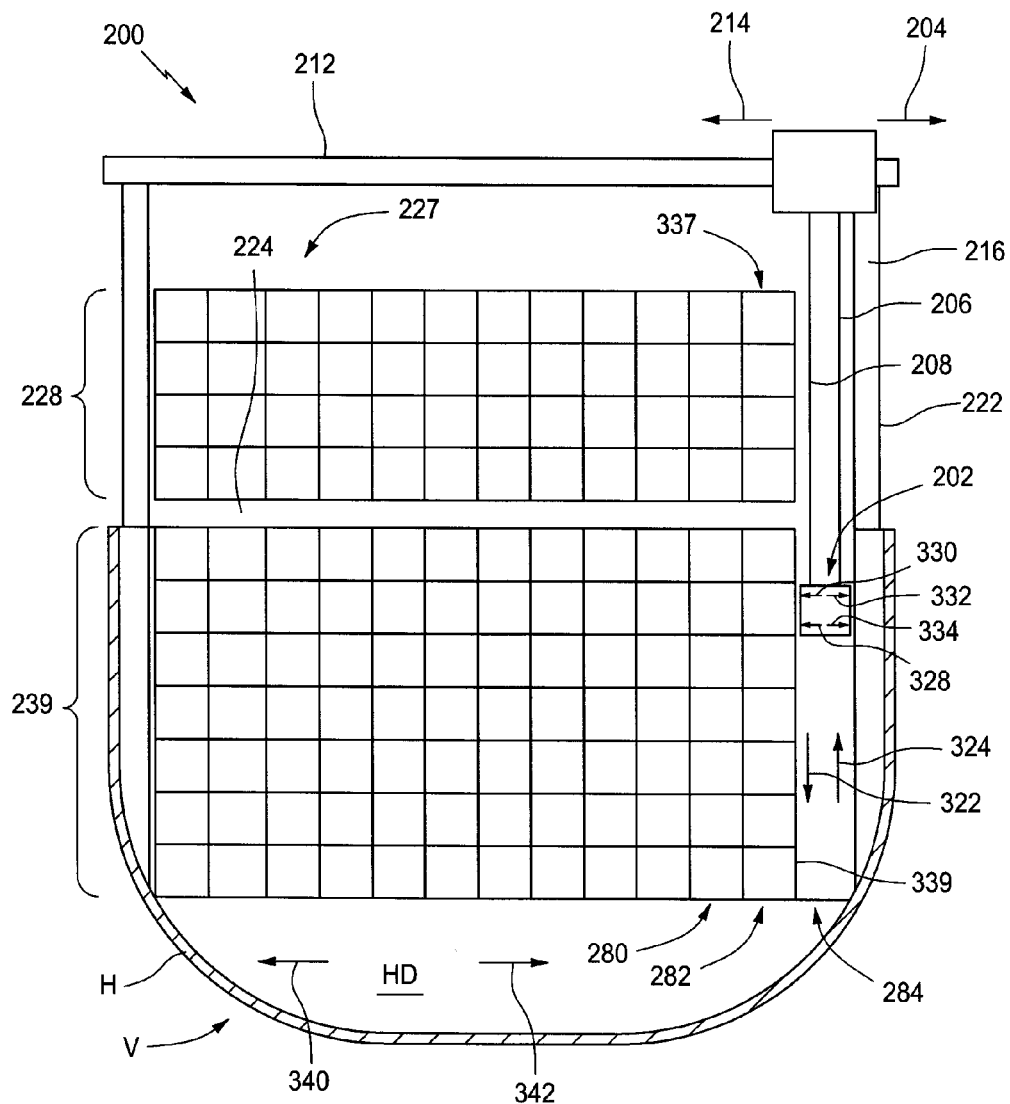
FIGS. 5-9 are schematic cross-sectional views similar to FIG. 3 illustrating successive scanning according to the present invention, with FIG. 6 showing a vacant aisle in the same position as illustrated in FIG. 3.

FIGS. 5-9 are schematic cross-sectional views similar to FIG. 3, with corresponding reference numerals, illustrating one procedure for successive scanning according to the present invention. FIG. 5 shows all containers 227 in both groups 228 and 239 shifted to the starboard side of vessel V, in the direction of arrow 340, to establish column 284 as a vacant aisle. Hoist 204 has been moved in direction 216 to the port side adjacent crane leg 222 to position scanner 202 over the vacant aisle. Scanner 202 is lowered by cables 206 and 208 from hoist 204 to scan containers in column 282 in a pre-selected sequence, typically top-to-bottom, beginning with container 337, or bottom-to-top, beginning with container 339. Wheels, rollers, fenders, skids or other protective items (not shown) can be added to the sides of the scanner 202 to cushion it during travel down the vacant aisle, direction 322, or up, direction 324.

Figure 7:
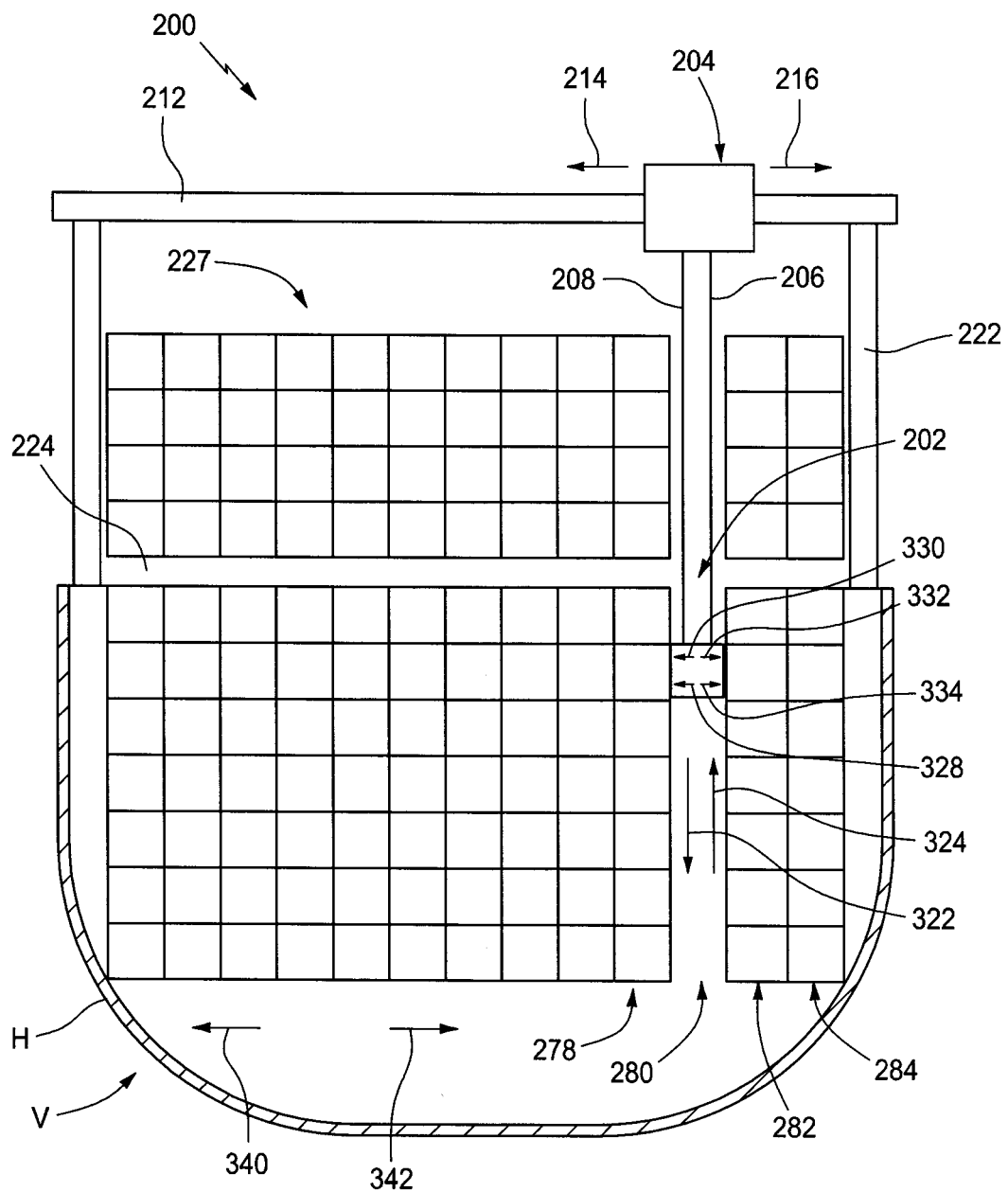
Figure 8:
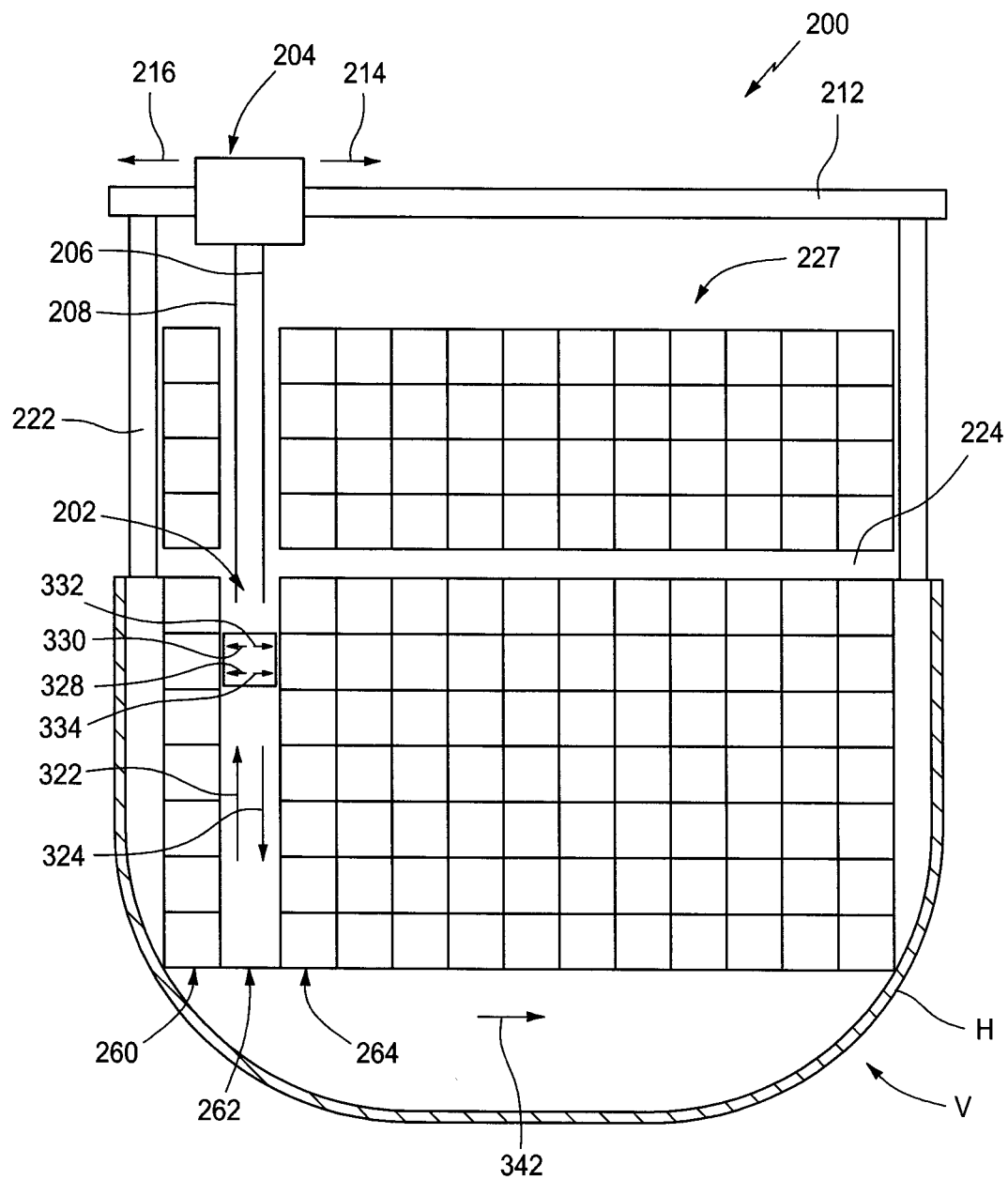
Figure 9:
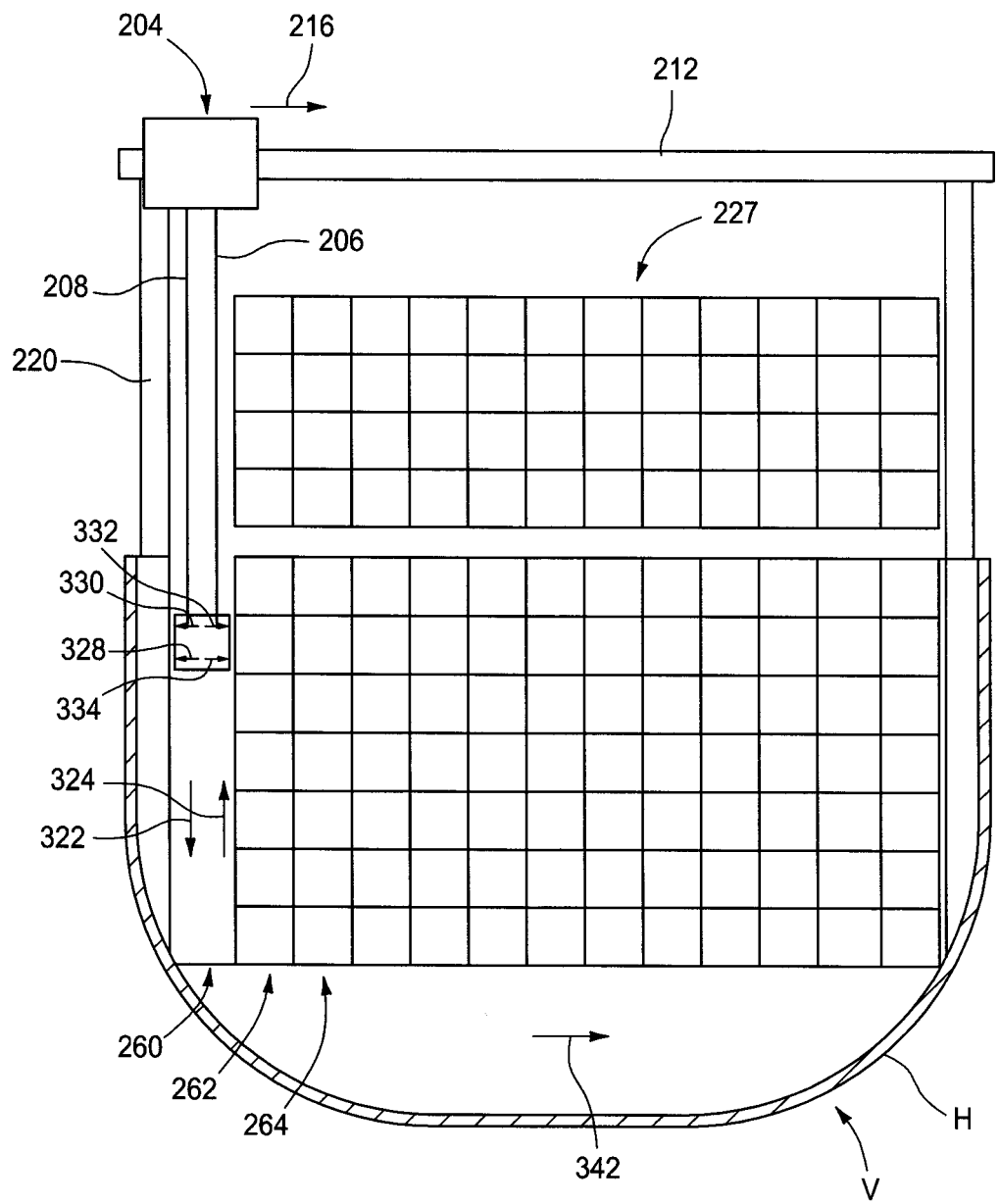

Scanner 202 is shown in FIGS. 5-9 with starboard-side detectors 328 and 330 and port-side detectors 332 and 334 in this construction. When a vacant aisle is established at the outer sides of the containers 227, such as shown in FIGS. 5 and 9, then the outer-most detectors can be deactivated or can be utilized as a "control" or reference.

Figure 6:
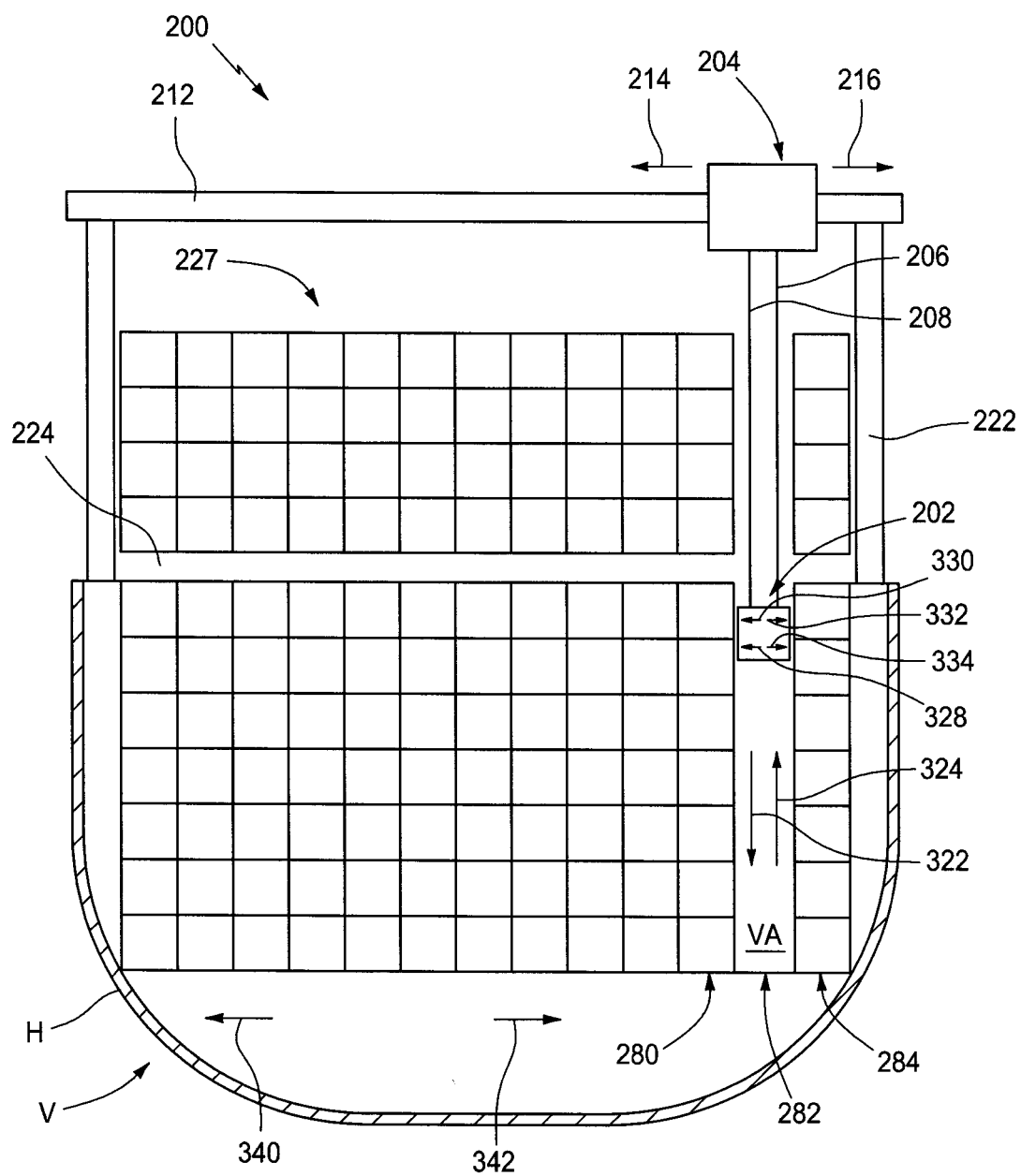

FIG. 6 shows a vacant aisle VA in the same position as illustrated in FIG. 3, that is, in column 282, to scan containers in columns 280 and 284 after the containers in column 282, FIG. 5, have been shifted in the direction of arrow 342. FIG. 7 shows containers 227 arranged to establish a vacant aisle in column 280 to scan containers in columns 278 and 282. In this construction, racks establishing columns of containers are successively shifted in the direction of arrow 342 until, as shown in FIG. 8, scanner 202 scans containers in columns 260 and 264 along a vacant aisle in column 262. FIG. 9 shows containers in column 262 being scanned adjacent to a vacant aisle in column 260.

The system and method according to the present invention enable scanning of at least two sides of each selected container, which increases detection accuracy. When scanning a single side of each selected container is sufficient, then vacant aisles can be established every other column such as columns 262 (FIG. 8), 266, 270, 274, 278 and 282 (FIG. 6) while skipping columns 260 (FIG. 9), 264, 268, 272, 276, 280 (FIG. 7) and 284 (FIG. 5).

While a system and method according to the present invention has been described above in connection with intermodal containers on a vessel, that is not a limitation of the invention. Containers, crates and other objects can be scanned according to the present invention in other transportation equipment in some constructions. In other constructions, objects are scanned according to the present invention in a stationary warehouse or other storage facility such as disclosed by the present inventor in U.S. Patent Publication 2012-0251277, which is incorporated by reference in its entirety.

Although specific features of the present invention are shown in some drawings and not in others, this is for convenience only, as each feature may be combined with any or all of the other features in accordance with the invention. While there have been shown, described, and pointed out fundamental novel features of the invention as applied to one or more preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

Every issued patent, pending patent application, publication, journal article, book or any other reference cited herein is each incorporated by reference in their entirety.

What is claimed is:

1. A method of scanning a number of objects in a multi-level environment, comprising:
    selecting a storage area having a plurality of movable racks, each rack occupying at least one level and capable of carrying at least one object;
    selecting a scanner;
    establishing a first vacant multi-level aisle among the racks;
    moving the scanner substantially vertically within the first vacant aisle to scan successive objects substantially adjacent to the first vacant aisle to detect at least one pre-determined characteristic;
    establishing at least a second vacant multi-level aisle among the racks; and
    moving the scanner substantially vertically within at least the second vacant aisle to scan additional objects substantially adjacent to the second vacant aisle.

2. The method of claim 1 wherein each rack includes a chassis movable along at least one track.

3. The method of claim 1 wherein each rack is movable in at least one side direction.

4. The method of claim 1 wherein each rack is configured to hold at least one intermodal container.

5. The method of claim 4 wherein the scanner is suspended from a crane capable of lifting at least one intermodal container.

6. The method of claim 1 further including generating an alert when the scanner detects the at least one pre-determined characteristic.

7. A method of scanning a number of intermodal containers, comprising:
    selecting a vessel having at least one cargo hold having a plurality of movable racks, each rack occupying at least one level and capable of carrying at least one container;
    selecting a scanner;
    establishing a first vacant multi-level aisle among the racks;
    moving the scanner substantially vertically within the first vacant aisle to scan successive containers substantially adjacent to the first vacant aisle to detect at least one pre-determined characteristic;
    establishing at least a second vacant multi-level aisle among the racks; and
    moving the scanner substantially vertically within at least the second vacant aisle to scan additional containers substantially adjacent to the second vacant aisle.

8. The method of claim 7 wherein each rack includes a chassis movable along at least one track secured within the cargo hold.

9. The method of claim 7 wherein each rack is movable in at least one side direction.

10. The method of claim 7 wherein the scanner is suspended from a crane capable of lifting at least one intermodal container.

11. The method of claim 7 further including generating an alert when the scanner detects the at least one pre-determined characteristic in a container.

12. The method of claim 11 further including placing containers having the detected pre-determined characteristic in at least one of quarantine and disposal.

13. The method of claim 7 wherein at least two sides of substantially each container are scanned.

14. The method of claim 7 wherein the containers are scanned while the vessel is underway.

15. A system of scanning a number of intermodal containers, comprising:
    a storage area having a plurality of movable racks, each rack occupying at least one level and capable of carrying at least one container, the racks capable of being moved to establish successive vacant multi-level aisles among the racks; and
    at least one scanner movable substantially vertically within the successive vacant aisles to scan successive containers substantially adjacent to each vacant aisle to detect at least one pre-determined characteristic.

16. The system of claim 15 wherein each rack includes a chassis movable along at least one track.

17. The system of claim 15 wherein each rack is movable in at least one side direction.

18. The system of claim 15 wherein the scanner is suspended from a crane capable of lifting at least one intermodal container.

19. The system of claim 15 wherein the system generates an alert when the scanner detects the at least one pre-determined characteristic.

* * * * *